(12) United States Patent
Schnatterer et al.

(10) Patent No.: US 10,781,972 B2
(45) Date of Patent: Sep. 22, 2020

(54) SAFETY ASSEMBLY FOR A STORAGE SYSTEM, AND STORAGE SYSTEM

(71) Applicant: Kardex Produktion Deutschland GmbH, Bellheim (DE)

(72) Inventors: Juergen Schnatterer, Jockgrim (DE); Harald Preschke, Vohringen (DE); Wolfgang Kollmann, Pfaffenhausen (DE)

(73) Assignee: KARDEX PRODUKTION DEUTSCHLAND GMBH, Bellheim (DE)

( * ) Notice: Subject to any disclaimer, the term of this patent is extended or adjusted under 35 U.S.C. 154(b) by 0 days.

(21) Appl. No.: 16/333,680

(22) PCT Filed: Aug. 22, 2017

(86) PCT No.: PCT/EP2017/071098
§ 371 (c)(1),
(2) Date: Mar. 15, 2019

(87) PCT Pub. No.: WO2018/050403
PCT Pub. Date: Mar. 22, 2018

(65) Prior Publication Data
US 2019/0264870 A1    Aug. 29, 2019

(30) Foreign Application Priority Data
Sep. 16, 2016   (DE) .................. 10 2016 217 786

(51) Int. Cl.
*G08B 13/08* (2006.01)
*F16P 1/02* (2006.01)
(Continued)

(52) U.S. Cl.
CPC .................. *F16P 1/02* (2013.01); *F16P 3/08* (2013.01); *F16P 3/12* (2013.01); *F16P 3/142* (2013.01);
(Continued)

(58) Field of Classification Search
CPC ...... F16P 1/02; F16P 3/12; F16P 3/142; F16P 3/144; F16P 3/08; E05D 15/0652
(Continued)

(56) References Cited

U.S. PATENT DOCUMENTS 7,924,164 B1 * 4/2011 Staerzl .................. F16P 3/142
                                                  192/129 R
8,730,030 B2 * 5/2014 Anderson ............... F16P 3/147
                                                  340/539.1
(Continued)

FOREIGN PATENT DOCUMENTS

DE    3928984    3/1991
DE    9401822    3/1994
(Continued)

*Primary Examiner* — Toan N Pham
(74) *Attorney, Agent, or Firm* — Barnes & Thornburg LLP; Jeffrey R. Stone

(57) ABSTRACT

The present invention relates to a safety assembly (1) for a storage system (2), in particular a storage carousel system, comprising at least one tarp (3) and a fastening device (4) for fastening the tarp (3), the tarp (3) delimiting a hazard region (5) on one side (6) thereof against a working region (7) on the other side (8) thereof, and further comprising a hazard detector (9), which is associated with the hazard region (5) and which detects an ingress of an object (10) into the hazard region (5) and outputs an alarm signal. The invention further relates to a storage system (2).

18 Claims, 10 Drawing Sheets

Figure 1:
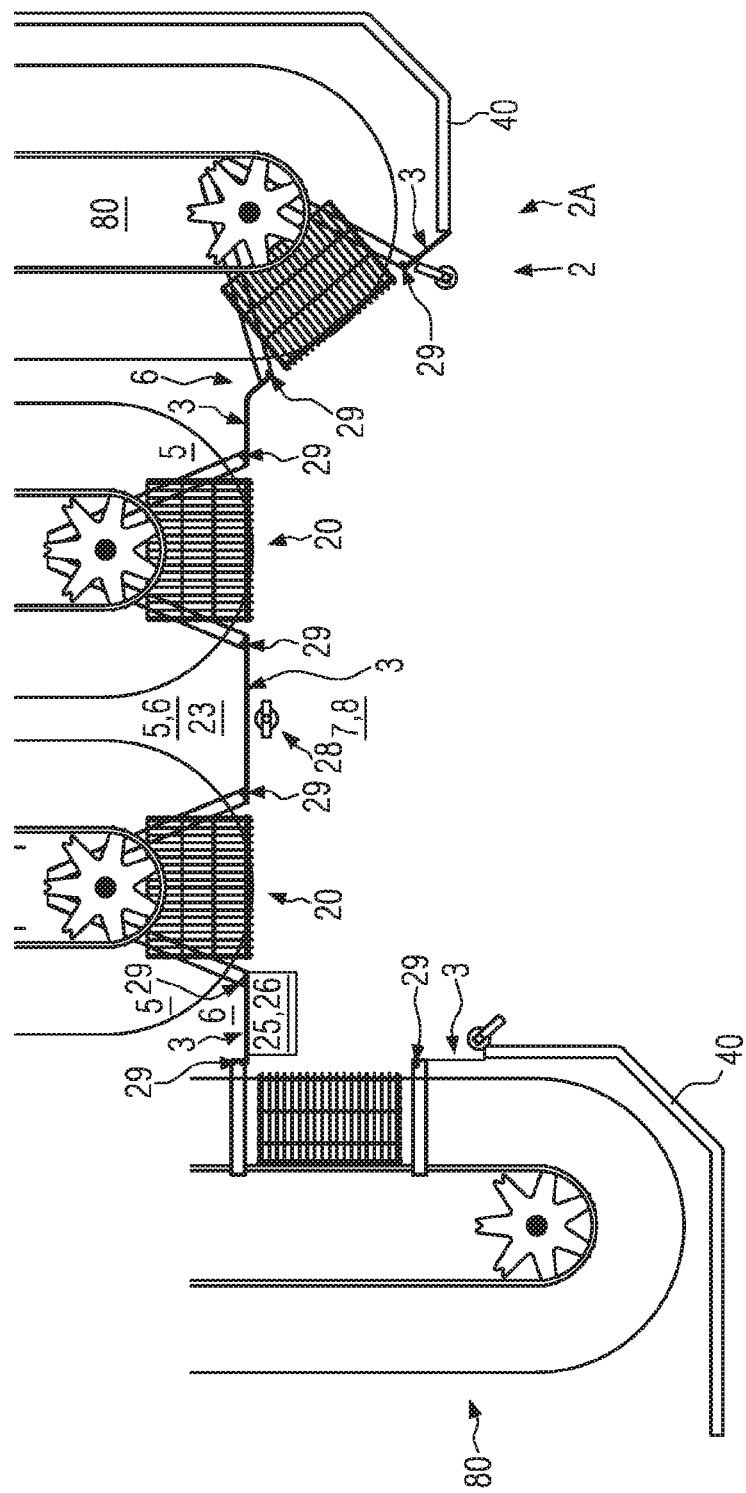

(51) Int. Cl.
 *F16P 3/08* (2006.01)
 *F16P 3/14* (2006.01)
 *F16P 3/12* (2006.01)
 *B65G 1/133* (2006.01)

(52) U.S. Cl.
 CPC .............. *F16P 3/144* (2013.01); *B65G 1/133* (2013.01); *B65G 2207/40* (2013.01)

(58) Field of Classification Search
 USPC ....... 340/545.2, 548, 545.6, 545.8, 550, 565
 See application file for complete search history.

(56) References Cited

U.S. PATENT DOCUMENTS

| | | | |
|---|---|---|---|
| 9,103,496 B2* | 8/2015 | Torosian | ................. G01V 8/20 |
| 2014/0144597 A1 | 5/2014 | Collard et al. | |
| 2017/0352216 A1* | 12/2017 | Donovan | ............. H03K 17/955 |

FOREIGN PATENT DOCUMENTS

| | | |
|---|---|---|
| DE | 202012100396 | 5/2013 |
| DE | 202013105390 | 2/2015 |
| EP | 0636451 | 2/1995 |
| EP | 2186761 | 5/2010 |
| EP | 2796390 | 10/2014 |

\* cited by examiner

SAFETY ASSEMBLY FOR A STORAGE SYSTEM, AND STORAGE SYSTEM

The present invention relates to a safety assembly for a storage system, and a storage system. The storage system may especially be a storage carousel system, in particular a horizontal storage carousel system.

Such a storage system often entails a risk for a user or operator when, for example, parts of the storage system move. The user may be injured by such moving parts. In particular, there is the risk that the user's body parts may get caught. Due to the structural conditions, it is often impossible to install elements that can control access, such as automatic doors.

It is the object of the present invention to provide a solution, which keeps the risk to a user as low as possible even under difficult structural conditions.

According to the present invention, this is achieved by a safety assembly for a storage system, in particular a storage carousel system, comprising at least one tarp and a fastening device for fastening the tarp, the tarp delimiting a hazard region on one side thereof against a working region on the other side thereof, and further comprising a hazard detector, which is associated with the hazard region and which detects ingress of an object into the hazard region and outputs an alarm signal.

A storage system according to the present invention comprises a safety assembly according to the present invention.

The tarp serves to delimit or shield a hazard region from the working region. Hence, it is impossible for a user to enter the hazard region through the tarp. Other than in the case of a rigid shielding, such as a metal sheet, the user will, due to the flexibility of the tarp, not even be injured, if he unintentionally comes into contact with a moving part e.g. with one hand and his hand gets caught between the moving part and the tarp. The hazard detector, however, detects the ingress into the hazard region and outputs a signal. Such an alarm signal may be used e.g. for stopping a storage system and for excluding further risks. Another advantage is that a tarp may also be less expensive and may require less maintenance than a fixed barrier.

In an appropriate process, the hazard detector monitors the hazard region and outputs the alarm signal, when the object enters the hazard region. Alternatively or additionally, the alarm signal can be outputted, if protruding or dropping stored products enter the hazard region and would thus endanger the user or the storage system.

The solution according to the present invention can be improved still further by the embodiments and further developments which follow hereinafter and each individual of which is advantageous.

The tarp may be adapted to be transferred from an initial condition to a hazard condition, in which the tarp is deformed in comparison with the initial condition, and the hazard detector may be operatively connected to the tarp and detect the hazard condition of the tarp. The initial condition may e.g. be a condition in which the tarp is stretched flatly or in which the tarp hangs down loosely. If the user deforms the tarp, e.g. by entering the hazard region from the side or from a working region, this will be detected, i.e. recorded or registered, by the hazard detector so that the latter will output an alarm signal.

In order to allow the simplest possible structural design, the hazard detector may be in contact with the tarp in the initial condition and/or in the hazard condition.

According to an advantageous embodiment, the hazard detector may be directed towards the hazard region so as to allow easy monitoring.

For a simple and particularly sensitive detection, the hazard detector may comprise a non-contact sensor.

The hazard detector may comprise an optical monitoring system, by means of which e.g. movements in the hazard region are detected. In this way, a particularly simple and reliable monitoring will be possible.

The hazard detector may comprise a light barrier. This can allow to delimit the hazard region from the working region very well and to increase the detection reliability simultaneously.

A light barrier may comprise e.g. a light transmitter, a light receiver, a laser, a diode or the like. In particular, the light barrier may be interrupted in the alarm condition.

In an alternative embodiment, the hazard detector may comprise a rope and/or a limit switch. With such a solution, which is more of a mechanical nature, a higher degree of operational reliability can be achieved, by way of example.

The rope may extend e.g. parallel to the tarp, so as to allow a compact structural design. It may extend e.g. directly behind or alongside the tarp so as to make detection easy and allow a high sensitivity of the system. The rope or the limit switch may be deflected in the hazard condition. A rope may e.g. extend straight in the initial condition and non-straight in the hazard condition. Such a design can be structurally realized in an easy manner. In order to be able to transmit movements, mechanical transmission elements may be provided.

The safety assembly or the storage system may comprise tensioning means for the tarp. Through tensioning, undesired movements of the tarp can be avoided. Tensioning means may comprise e.g. springs, rubber-elastic elements or pulleys.

Alternatively, the tarp may be suspended, e.g. by fixing on a single side. This kind of structural design can, for example, make access to the hazard region particularly easy, e.g. when the storage system is deactivated for the purpose of maintenance.

The storage system may further comprise a removal opening for removing the stored products, the tarp being arranged next to the removal opening. The arrangement next to the removal opening increases safety in a particularly effective manner, since in this area there is an increased risk that the user may enter the hazard region during the removal operation. In addition, the removal opening may be used not only for removal, but also for filling the storage system. In this context, next to may mean in particular to the left and/or to the right of the removal opening, left and right being here seen relative to a user. It will be advantageous when the tarp is arranged next to the storage system in or against a direction of movement of the storage system, since this is the area of greatest risk for a user.

Alternatively or additionally, the tarp my also be arranged above or below the removal opening, so as to provide protection in this area as well.

The tarp may be arranged such that it adjoins the removal opening to provide a short response time.

One or a plurality of tarps may have a reach-through area for operation. For example, a tarp may have a reach-through area delimited in two dimensions. The reach-through area may e.g. be rectangular or circular in shape. A plurality of tarps may have individual cutouts defining together a reach-through area or a removal opening.

According to an advantageous embodiment, the storage system comprises an interrupter system, which stops a drive of the storage system depending on an alarm signal. Safety will be increased in this way. Alternatively or additionally, the safety assembly or the storage system may output an optical or an acoustic signal, when the hazard detector outputs an alarm signal.

The removal opening may be delimited by one or a plurality of tarps on at least two sides. The tarp or the tarps may form or delimit the removal opening at least partially. Additional elements for forming the removal opening can be dispensed with.

The hazard detector may be arranged on the side facing the storage. This allows a compact structural design that will not disturb the user in the working region.

The storage system may be higher than the area of reach of a user. The solution according to the present invention is particularly advantageous for this kind of systems, since in such cases auxiliary devices, such as stairs or platforms, do often not permit the provision of access systems, such as automatic doors. Installation of a tarp is, however, possible, since a tarp is much thinner. In particular, the storage system may be a multi-level system.

The storage system may comprises a staircase adjoining the tarp or a platform adjoining the tarp. The solution according to the present invention allows here a particularly space-saving structural design and thus ergonomic working at the storage system.

In the following, the present invention will exemplarily be explained in more detail on the basis of advantageous embodiments making reference to the drawings. The advantageous further developments and embodiments shown in this context are independent from one another and may be combined in an arbitrary manner, depending on the requirements to be satisfied in the respective case of use.

Figure 2:
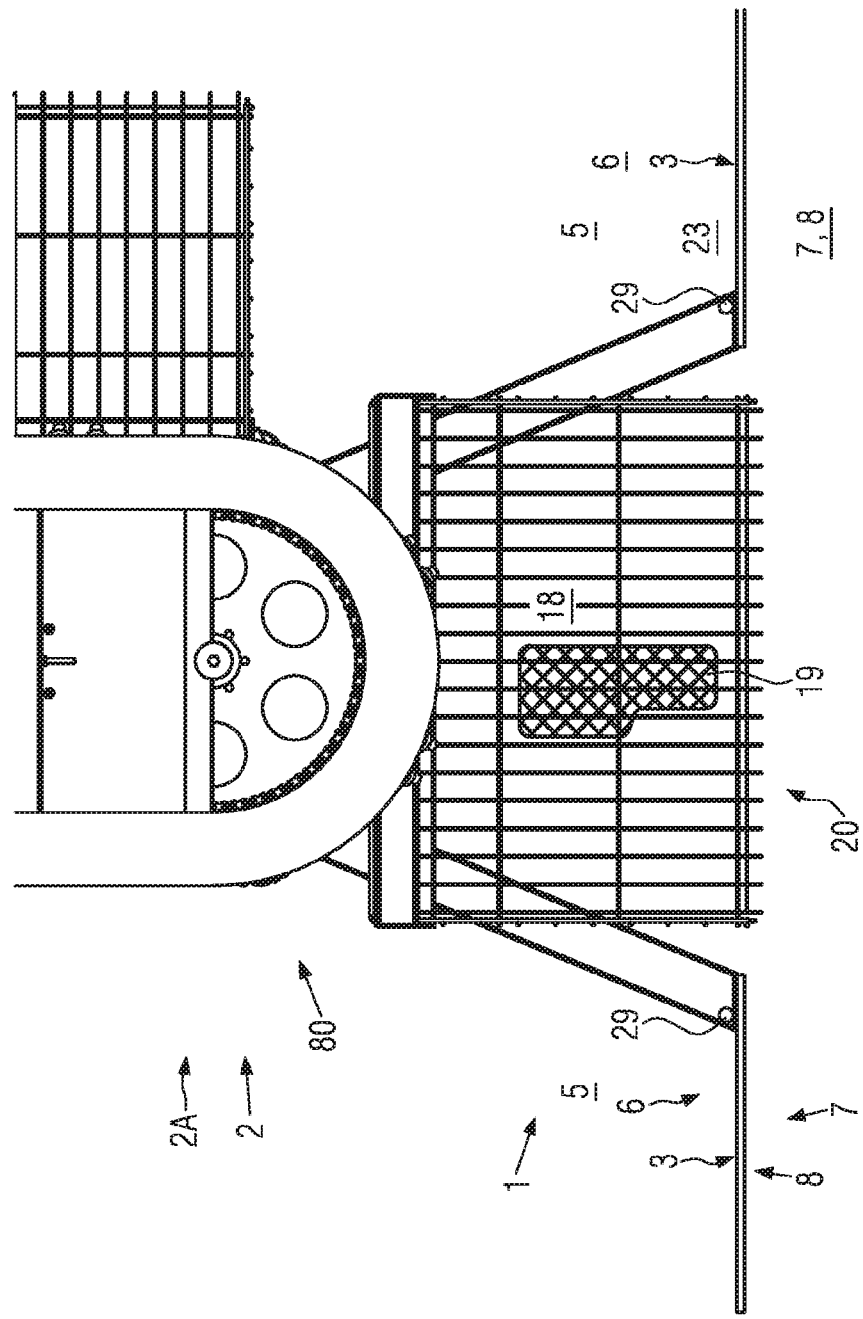
Figure 3:
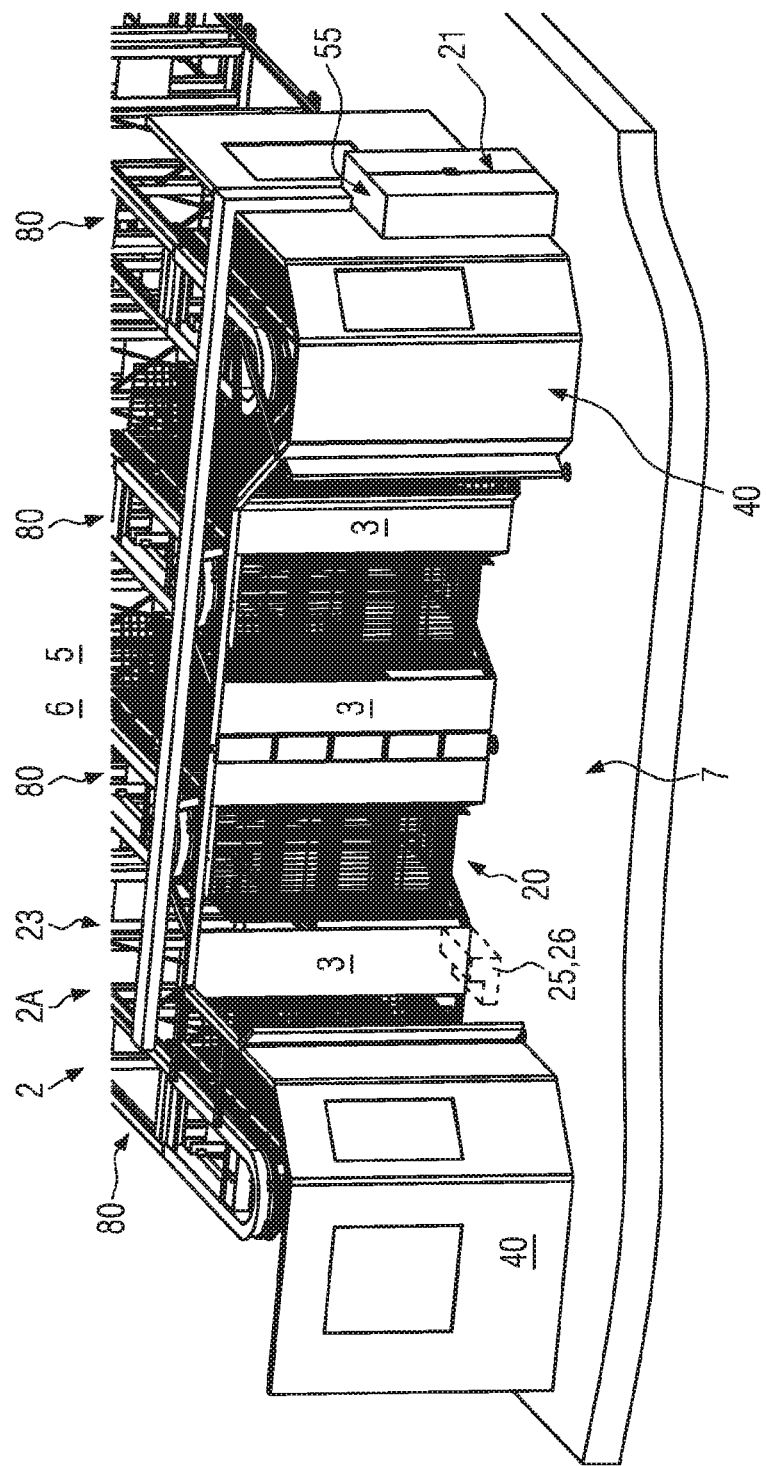
Figure 4:
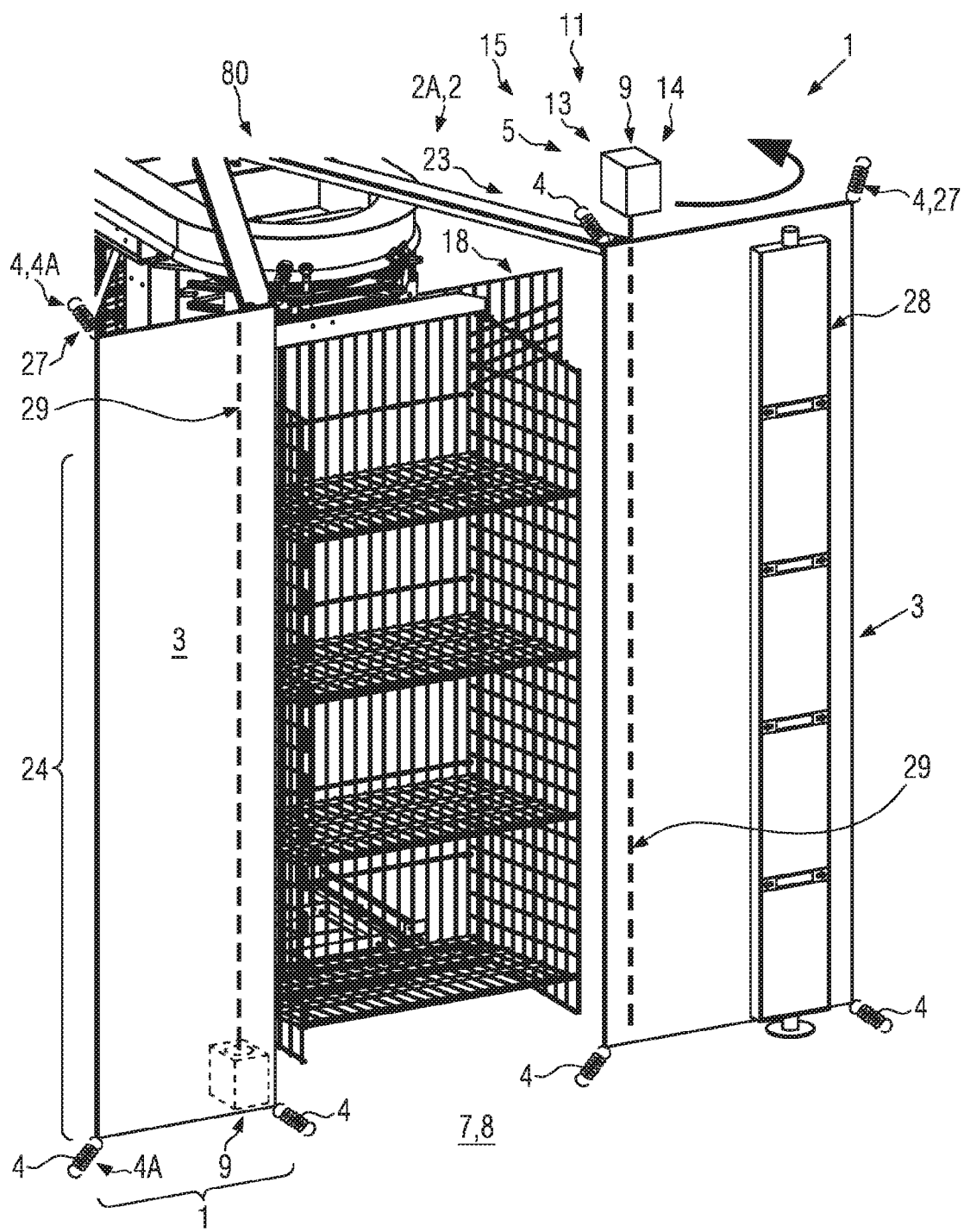
Figure 5:
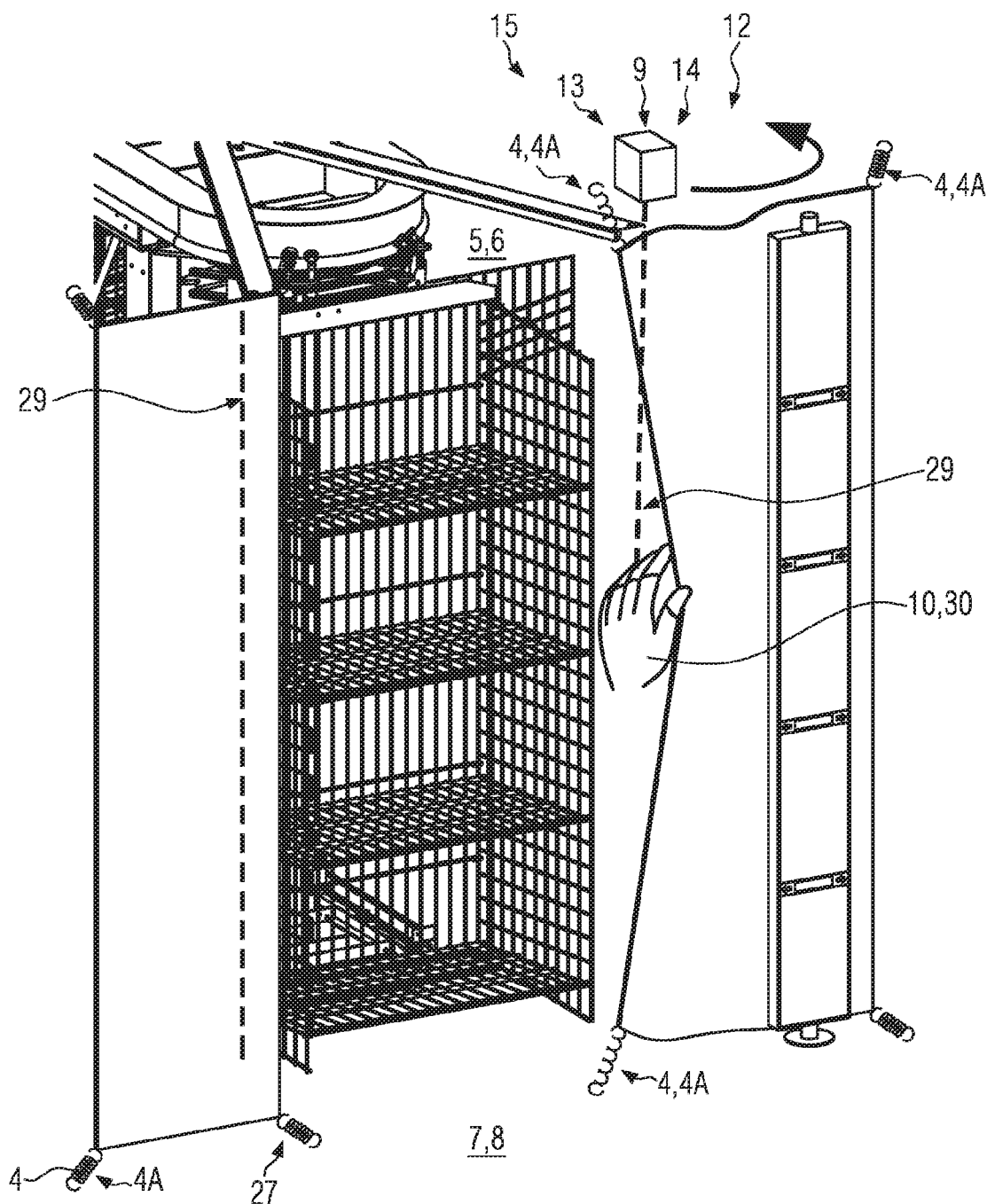
Figure 6:
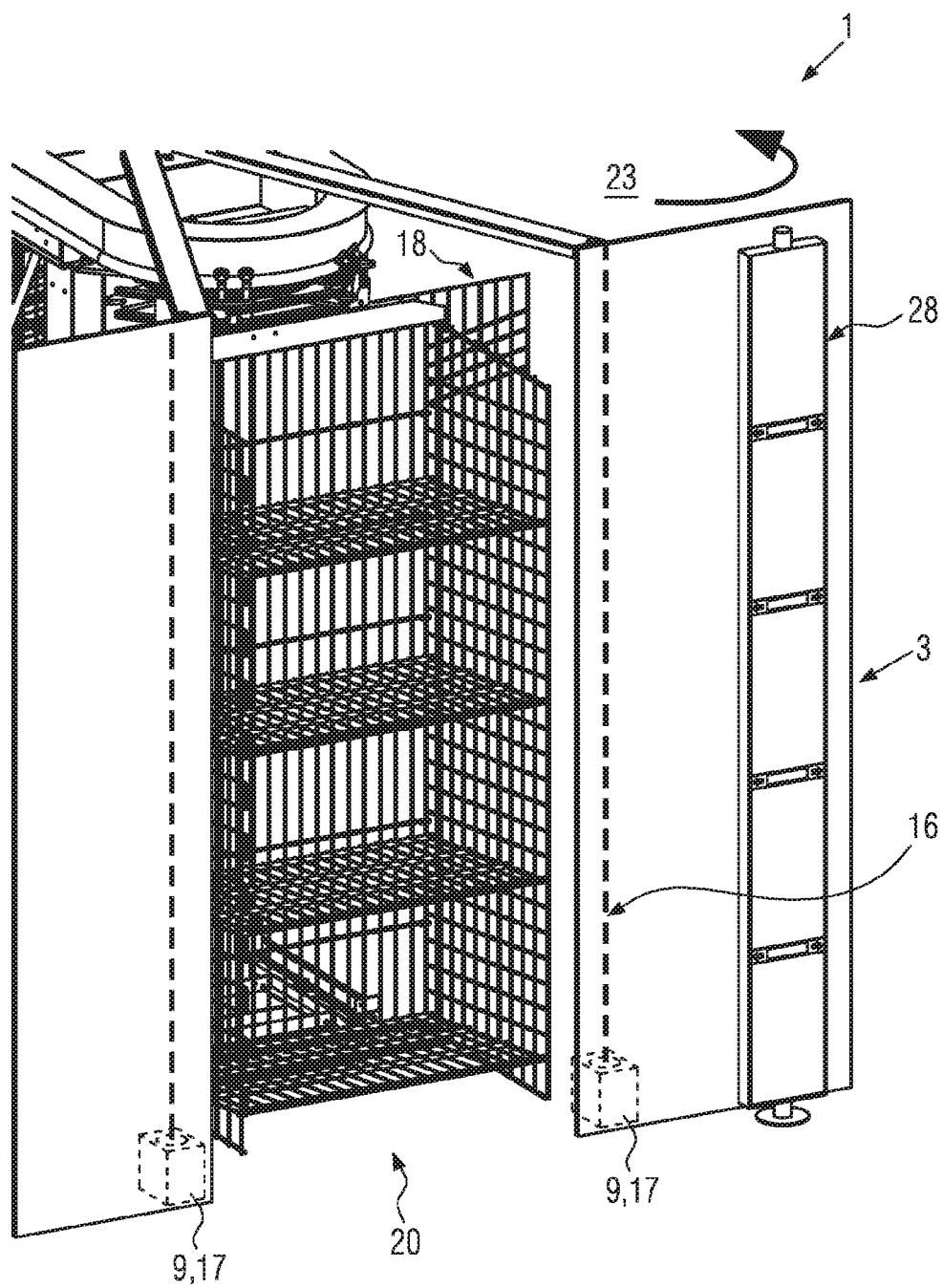
Figure 7:
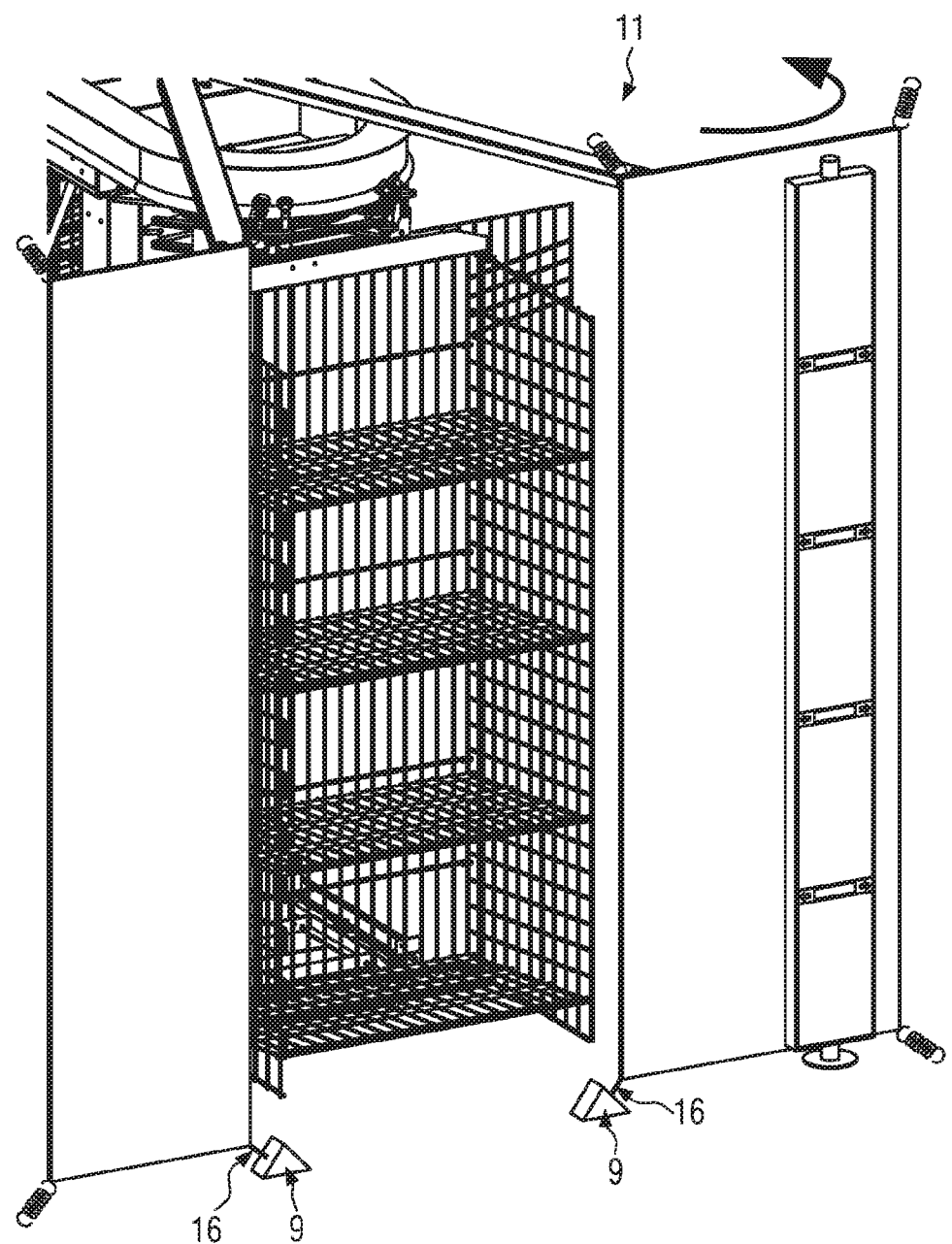
Figure 8:
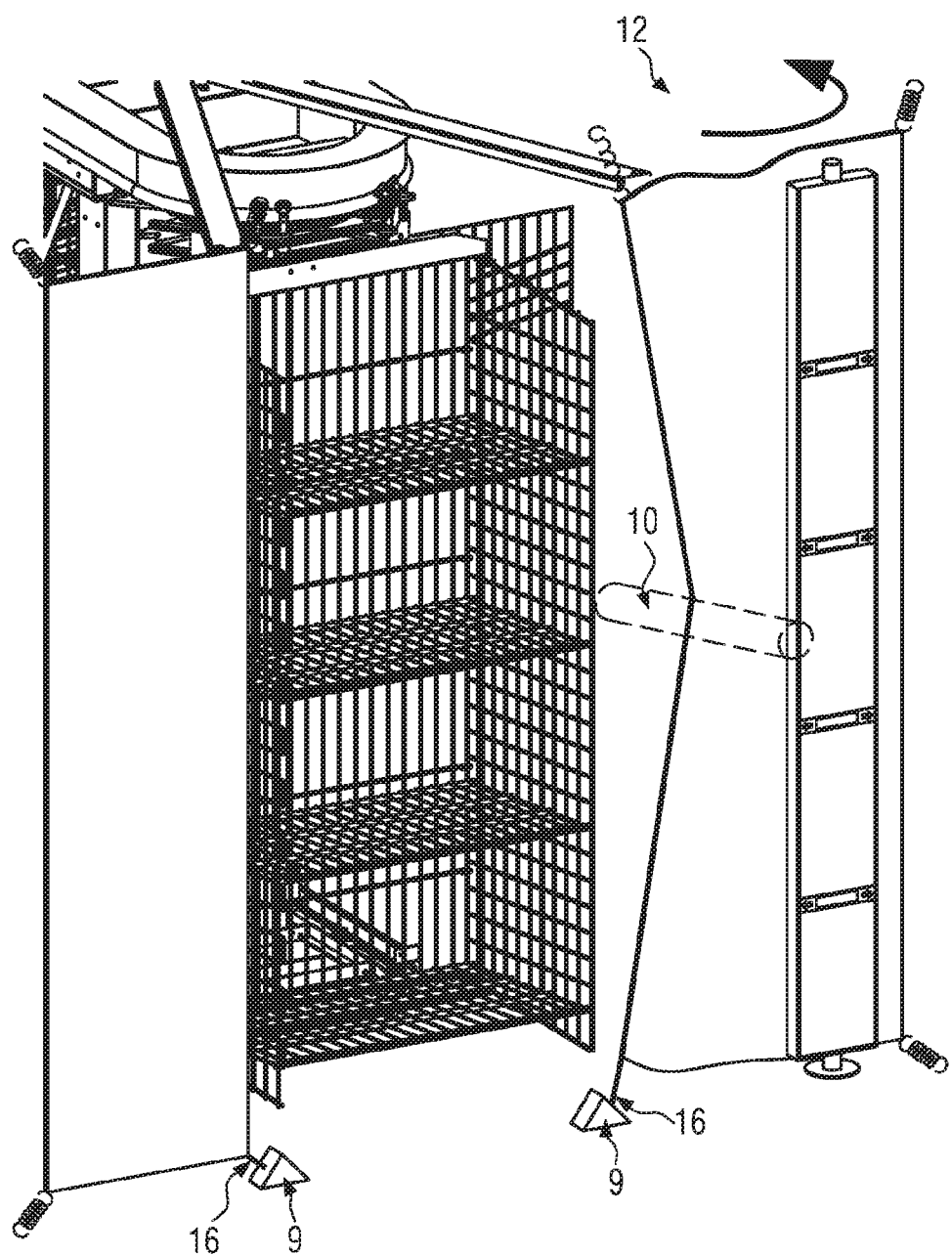
Figure 9:
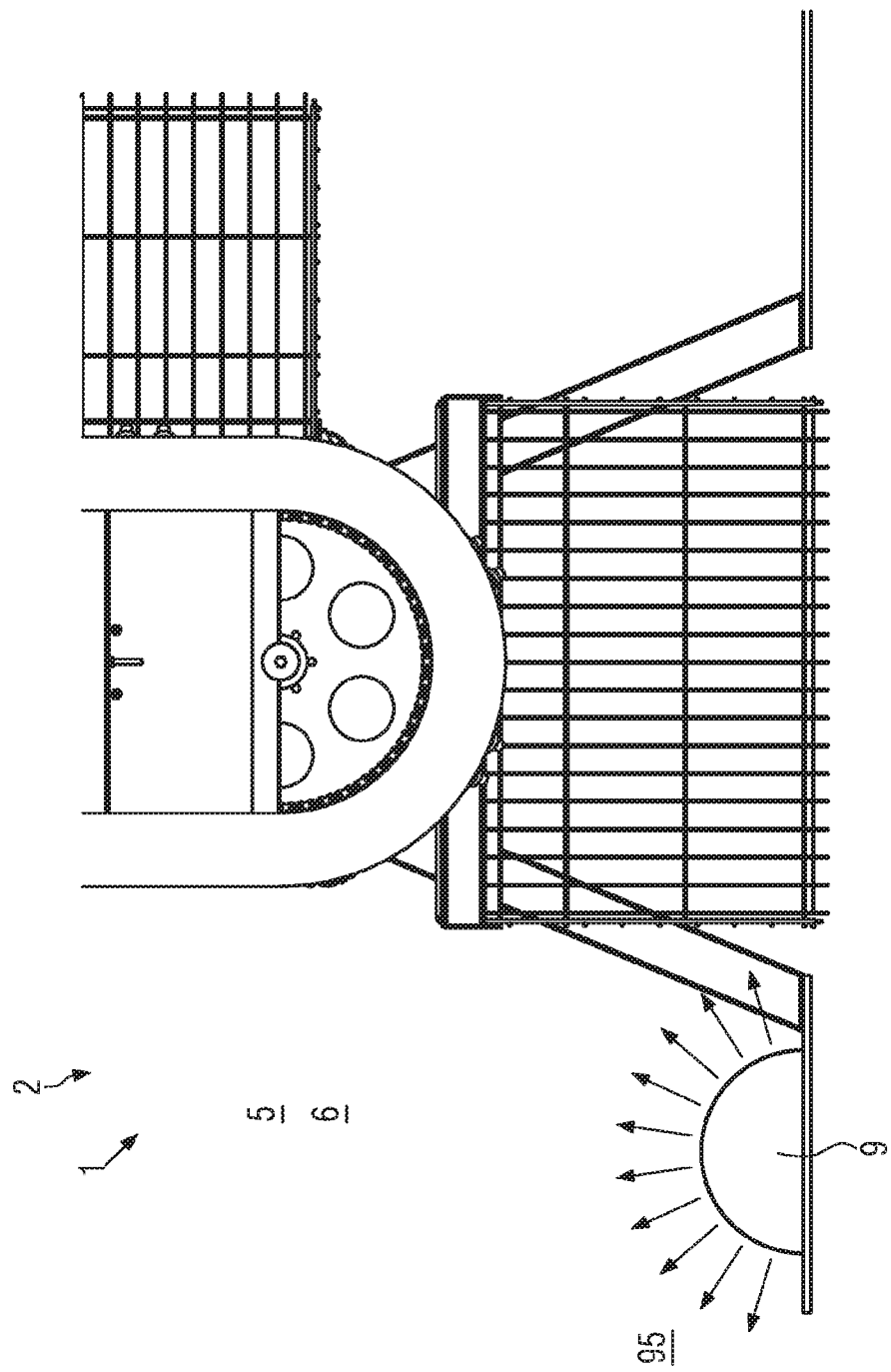

The figures show:

FIG. 1 a schematic top view of an embodiment of the solution according to the present invention;

FIG. 2 a schematic top view of an embodiment of the solution according to the present invention;

FIG. 3 a schematic perspective view of the embodiment according to FIG. 1;

FIG. 4 a detail view of the embodiment according to FIG. 3;

FIG. 5 a detail view according to FIG. 4 in a hazard condition of the tarp;

FIG. 6 a schematic perspective view of a further embodiment;

FIG. 7 a schematic perspective view of a further embodiment;

FIG. 8 a schematic perspective view of a further embodiment according to FIG. 7 in a hazard condition;

FIG. 9 a further embodiment in a schematic top view; and

Figure 10:
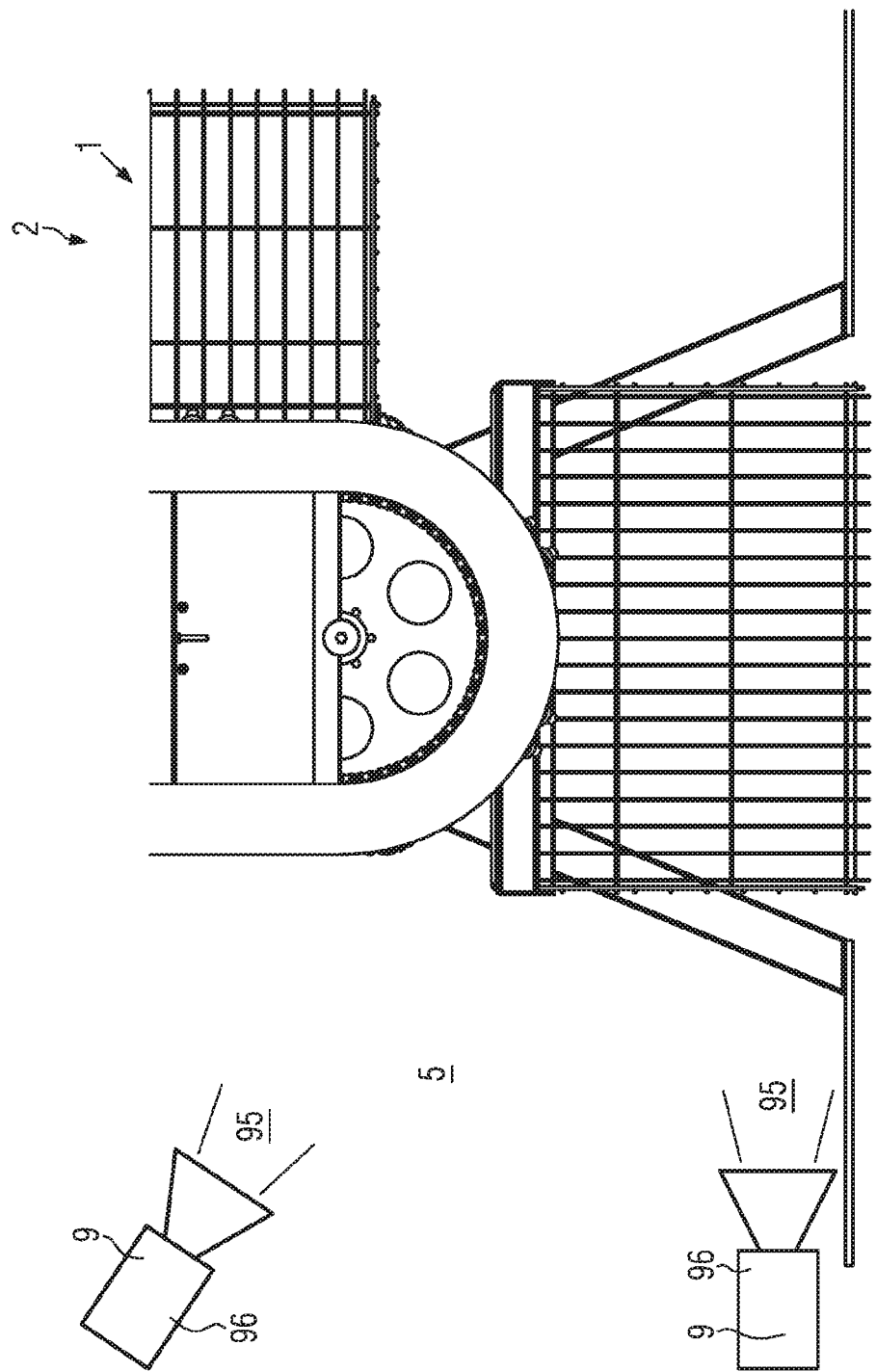

FIG. 10 a further embodiment in a schematic top view.

FIGS. 1 to 3 show a storage system 2 with a safety assembly 1. The storage system 2 is a storage carousel system 2A, in particular a horizontal storage carousel system. A plurality of stored-product carriers 18 for storing stored-products 19 circulate horizontally. A user or operator can remove stored-products from removal openings 20. A control unit 55 controls the circulation and moves the respective appropriate stored-product carrier 18, which has arranged thereon a desired stored-product 19, to a removal opening 20. The user is then able to remove stored-products 19 from one or from a plurality of removal openings 20 and, for example, compile an order therefrom.

The storage system 2 comprises a working area 7, in which e.g. a user is present, and a hazard region 5, which comprises a plurality of storage arrangements 80 and which is dangerous for the user due to the moving stored-product carriers 18. If objects or parts of the user's body enter the hazard region 5, there is e.g. the risk that they may get caught. In order to prevent this, the storage system 2 has, at some places, walls 40, which are stable and thus prevent access to the moving parts of the storage system 2. At some other places, it is not possible to install such rather thick and voluminous walls 40, since e.g. stairs 25 or platforms 26 are to be mounted, so that also products 19 stored on a higher level can easily be reached and, at the same time, work can be kept as ergonomic as possible for the user.

The storage system 2 is therefore provided with tarps 3 that are installed vertically by means of fastening devices 4, such as springs 4A. They separate the hazard region 5 on one side 6 thereof from a working region 7 on the other side 8 thereof. The springs 4A act here simultaneously as stretching means 27, which tighten the tarps 6.

The storage system 2 additionally comprises a hazard detector 9, which is associated with the hazard region 5 and which detects the ingress of an object 10 or of a part of the user's body into the hazard region 5 and outputs an alarm signal subsequently. Such an alarm signal may be subjected to further processing e.g. in the control unit 55 and may serve to stop a drive of the storage system 2. Subsequently, further risks for the user or a movement of the storage system 2 can be avoided. To this end, the control unit 55 may comprise an interrupter system 21 (not shown in detail), in which the alarm signal can be received and a drive can be stopped. In particular, the alarm signal outputted may also be of an optical or an acoustic nature.

In FIGS. 4 to 10 different embodiments of hazard detectors 9 are shown.

In the case of the embodiments according to FIGS. 4 and 5, the hazard detector 9 generates a light beam 29, e.g. a laser beam. The hazard detector 9 is consequently a light barrier 15, which detects when the light beam 29 is interrupted. If, for example, a user's hand 30 enters the hazard region 5, the light beam 29 will be interrupted. At the same time, the tarp 3 deforms gently so that, although the hand 30 is caught between the stored-product carrier 18 and the tarp 9 3, it will not be injured.

The light beam 29 extends directly behind the tarp 3 and next to the removal opening, which is at least partially defined by the tarps 3. If, for example, the tarp is not deflected to the side, as shown in FIG. 5, but towards the hazard region 5, the hazard detector 9 will nevertheless trigger an alarm signal. Also this can prevent injuries or damage still further. This hazard detector 9 comprises a non-contact sensor 13. In particular, it comprises an optical monitoring system 14 in the form of the light barrier 15. Like the other hazard detectors 9 shown, also this hazard detector 9 may comprise additional elements.

FIG. 6 shows a further embodiment. In this embodiment, the hazard detector 9 has a mechanical detection system. Instead of the light beam 29, a rope 16 is used, which is tensioned directly next to the removal opening behind the tarp 9 in the hazard region 5. If the user now touches the rope with his hand 30, e.g. because he gets caught on the stored-product carrier 18, the hazard detector 9 will be triggered and output an alarm signal. To this end, the hazard detector 9 may comprise a limit switch 17 that detects the pull on the rope 16. The rope 16 may be in contact with the tarp 3 in an initial condition 11 and/or in a hazard condition 12.

FIGS. 7 and 8 show a further embodiment. Also this embodiment is a hazard detector 9 that is able to detect a mechanical deflection. It is attached to a corner of the tarp 3 via a short rope 16. If the latter is deformed from the initial condition 11 in FIG. 7 to the hazard condition 12 in FIG. 8, e.g. because an object 10 enters the hazard region 5, the rope 16 will be pulled out of the hazard detector 9 and the hazard detector 9 will trigger the alarm state. Here, the ropes 9 also act as tensioning means 27.

FIG. 9 shows a further embodiment. In this case, the hazard detector 9 is a motion detector whose detection range 95 is directed towards the hazard region and covers the hazard region 5. The detection range 95 is delimited by a plane defined by the tarps 3.

FIG. 10 shows a further embodiment. The hazard detector 9 is formed by a camera 96. The camera 96 may be arranged at various places. It monitors the hazard region 5. Detection or recording of whether an object 10 or a body part enters the hazard region 5 can be determined e.g. by image evaluation making use of software. There may also be more than one camera 96, e.g. for enlarging the detection area 95 or for allowing a more precise evaluation.

As an alternative to the above shown representation, the hazard detector 9 may comprise not only a single light beam 29, but a plurality of light beams. The latter may, in particular, form a grid of light beams 29 that defines a plane behind the tarp 9. Also a plurality of hazard detectors 9 may be provided.

The figures also show display and control panels 28, where the user can make inputs and/or where the user obtains information, e.g. information on the current jobs.

REFERENCE NUMERALS 1 safety assembly
2 storage system
2A storage carousel system
3 tarp
4 fastening device
4A spring
5 hazard region
6 one side
7 working region
8 other side
9 hazard detector
10 object
11 initial condition
12 hazard condition
13 non-contact sensor
14 optical monitoring system
15 light barrier
16 rope
17 limit switch
18 stored-product carrier
19 stored products
20 removal opening
21 interrupter system
22 drive
23 side facing the storage
24 area of reach of a user
25 staircase
26 platform
27 tensioning means
28 display and control panel
29 light beam
30 hand
40 wall
50 storage system
55 control unit
80 storage arrangement
95 detection range
96 camera

The invention claimed is:

1. A storage system for stored products stored by means of stored-product carriers, the storage system comprising:
at least one storage arrangement comprising the stored-product carriers; and
at least one removal opening for removing the stored products; and
a safety assembly comprising:
at least one tarp arranged next to the at least one removal opening and a fastening device for fastening the tarp, the tarp delimiting a hazard region on one side thereof against a working region on the other side thereof such that the hazard region is arranged between the tarp and one or more of the at least one storage arrangement; and
a hazard detector, which is associated with the hazard region and which detects an ingress of an object into the hazard region and outputs an alarm signal.

2. The storage system according to claim 1, wherein the tarp is adapted to be transferred from an initial condition to a hazard condition, in which the tarp is deformed in comparison with the initial condition, and the hazard detector is operatively connected to the tarp and detects the hazard condition of the tarp.

3. The storage system according to claim 1, wherein the hazard detector is in contact at least one of when the tarp in the initial condition and when the tarp is in the hazard condition.

4. The storage system according to claim 1, wherein the hazard detector comprises a non-contact sensor.

5. The storage system according to claim 1, wherein the hazard detector comprises an optical monitoring system.

6. The storage system according to claim 1, wherein the hazard detector comprises a light barrier.

7. The safety assembly storage system according to claim 1, wherein the hazard detector comprises at least one of a rope and a limit switch.

8. The storage system according to claim 1, wherein the storage system comprises an interrupter system, which stops a drive of the storage system depending on an alarm signal.

9. The safety assembly storage system according to claim 1, wherein the hazard detector is arranged on a side facing a storage arrangement.

10. The storage system according to claim 1, wherein the storage system is higher than the area of reach of a user.

11. The storage system according to claim 1, wherein the storage system comprises a staircase adjoining the tarp or a platform adjoining the tarp.

12. The storage system according to claim 1, wherein the removal opening is delimited by the at least one tarp on at least two sides thereof.

13. The storage system according to claim 1, wherein the at least one tarp defines or delimits at least one part of the removal opening.

14. The storage system according to claim 1, wherein the removal opening is uncovered during operation of the storage system.

15. The storage system according to claim 1, wherein the at least one tarp entirely defines or delimits the removal opening such that the removal opening is not delimited by any rigid frame.

16. The storage system according to claim 1, wherein the at least one removal opening comprises a plurality of removal openings and wherein one of the at least one tarp is arranged between two of the plurality of removal openings.

17. The storage system according to claim 1, wherein the at least one tarp is arranged next to the at least one removal opening and not covering the at least one removal opening.

18. The storage system according to claim 1, wherein the at least one tarp is arranged at the side of the removal opening.

\* \* \* \* \*